United States Patent
Islam et al.

(10) Patent No.: US 12,058,669 B2
(45) Date of Patent: Aug. 6, 2024

(54) BANDWIDTH PART SWITCHING IN REPEATERS

(71) Applicant: QUALCOMM Incorporated, San Diego, CA (US)

(72) Inventors: Muhammad Nazmul Islam, Littleton, MA (US); Navid Abedini, Basking Ridge, NJ (US); Junyi Li, Fairless Hills, PA (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 17/444,980

(22) Filed: Aug. 12, 2021

(65) Prior Publication Data

US 2023/0051415 A1    Feb. 16, 2023

(51) Int. Cl.
  *H04W 72/1263* (2023.01)
  *H04L 27/26* (2006.01)
  *H04W 72/044* (2023.01)

(52) U.S. Cl.
  CPC ... *H04W 72/1263* (2013.01); *H04L 27/26025* (2021.01); *H04W 72/044* (2013.01)

(58) Field of Classification Search
  None
  See application file for complete search history.

(56) References Cited

U.S. PATENT DOCUMENTS

| | | | |
|---|---|---|---|
| 2020/0288359 A1* | 9/2020 | Kim | H04W 36/026 |
| 2021/0014829 A1* | 1/2021 | Kalhan | H04W 48/12 |
| 2021/0058145 A1 | 2/2021 | Alasti et al. | |
| 2021/0195674 A1* | 6/2021 | Park | H04W 76/18 |
| 2021/0218620 A1 | 7/2021 | Yuan et al. | |
| 2023/0179292 A1* | 6/2023 | Alasti | H04W 72/0453 370/335 |

FOREIGN PATENT DOCUMENTS

WO    WO-2022113809 A1 *  6/2022

OTHER PUBLICATIONS

International Search Report and Written Opinion—PCT/US2022/037179—ISA/EPO—Dec. 8, 2022.
Partial International Search Report—PCT/US2022/037179—ISA/EPO—Oct. 17, 2022.

* cited by examiner

*Primary Examiner* — Saumit Shah
(74) *Attorney, Agent, or Firm* — Arun Swain

(57) ABSTRACT

A repeater BWP switching schedule is provided for a repeater that is responsive to a user equipment BWP switching schedule. Should the repeater support a plurality of active user equipments, the user equipment BWP switching schedule is a superset of the BWP switching schedule for each individual user equipment. The repeater BWP switching schedule may thus be more granular than the UE BWP switching schedule.

19 Claims, 8 Drawing Sheets

BANDWIDTH PART SWITCHING IN REPEATERS

TECHNICAL FIELD

The technology discussed below relates generally to wireless communication systems, and more particularly, to a technique for bandwidth part switching in repeaters.

BACKGROUND

Wireless technologies and standards such as the third generation partnership project (3GPP) fifth generation New Radio (5G NR) standard have been developed for varies use cases including enhanced mobile broadband. As compared to older wireless communication protocols such as Long-term Evolution (LTE), 5G offers higher data rates and capabilities. With regard to supporting higher data rates, it is a fundamental concept in wireless communication that data rates are related to the channel bandwidth. For example, it is assumed in LTE that every wireless device such as a user equipment (UE) can support a 20 MHz channel bandwidth. But to achieve greater data rates, a 5G NR wireless device may have to support a greater channel bandwidth such as 100 MHz or even 400 MHz. But the use of such a relatively large channel bandwidth may consume substantial power. This power consumption may be wasteful during periods of relatively low-speed data transfer. 5G thus introduced the ability for a wireless device to support bandwidth adaptation. In particular, 5G introduced the concept of a bandwidth part, which broadly corresponds to the bandwidth that a wireless device currently supports. More particularly, a bandwidth part corresponds to a set of contiguous resource blocks configured for a device within a channel bandwidth.

It is advantageous to adapt or change a bandwidth part depending upon the data traffic. As more data is communicated, a bandwidth part may be enlarged. Conversely, a bandwidth part may be decreased during periods of low-bandwidth usage. The process of a wireless device changing from one bandwidth part to another is denoted as bandwidth part (BWP) switching. 3GPP established the BWP switching delay for a UE in Release 15. A UE must be able to finish a BWP switching within the required BWP switching delay. But such UE BWP switching is typically described with respect to a traditional radio access network (RAN) in which a base station includes both a baseband processing unit (BBU) and a radio unit (RU). To provide better coordination, scalable capacity, faster deployments, lower latency and support new use cases, the traditional RAN is evolving into RANs with functional splits. For example, a conventional base station in a traditional RAN may be decentralized in a virtual RAN between a core unit (CU), a distributed unit (DU) and a radio unit (RU). The DU may wirelessly transmit to the RU over a fronthaul link using a first BWP. Similarly, the RU transmits to the UE over an access link using a second BWP. A framework to control the BWP switching for an RU is currently undefined for 5G NR.

SUMMARY

In accordance with a first aspect of the disclosure, a method of wireless communication for a repeater is provided that includes: receiving at a repeater over a wireless fronthaul link a first command from an upstream unit; at the repeater, repeating the first command over a wireless access link to at least one user equipment, the first command being a command to switch at least one user equipment bandwidth part in the wireless access link according to a user equipment bandwidth part switching schedule; and switching a repeater bandwidth part for the repeater in the wireless access link according a repeater bandwidth part switching schedule that is responsive to the user equipment bandwidth part switching schedule.

In accordance with a second aspect of the disclosure, a method of bandwidth part switching for a repeater is provided that includes: in a first slot, receiving at the repeater a bandwidth part switching command for switching from a first bandwidth part to a second bandwidth part; determining a bandwidth part switching delay as a function of a subcarrier spacing for the first bandwidth part and a subcarrier spacing for the second bandwidth part; and in a second slot separated from the first slot by the bandwidth part switching delay, switching the repeater from the first bandwidth part to the second bandwidth part over a first component carrier for a wireless access link between the repeater and at least one user equipment.

In accordance with a third aspect of the disclosure, a repeater is provided that includes: a transceiver; and a processor configured to: process a first command received at the transceiver from an upstream unit over a wireless fronthaul link; control the transceiver to repeat the first command over a wireless access link to at least one user equipment, the first command being a command to switch at least one user equipment bandwidth part in the wireless access link according to a user equipment bandwidth part switching schedule; and control the transceiver to switch a repeater bandwidth part in the wireless access link according a repeater bandwidth part switching schedule that is responsive to the user equipment bandwidth part switching schedule.

These and other aspects of the disclosure will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

An advantageous framework for BWP switching by a radio unit (which also may be denoted as a repeater herein) is disclosed for networks in which the radio unit (RU) functions as a repeater. A core network communicates with a UE through a wireless fronthaul link between the UE and an RU. The upstream unit that drives the wireless fronthaul link to transmit to the RU depends upon how the base station functionality is implemented. In a virtualized radio access network (RAN), the upstream unit may be a distributed unit (DU) that communicates over the wireless fronthaul link with the RU. In a centralized RAN, the upstream unit may be a baseband processing unit (BBU) that communicates over the wireless fronthaul link with the RU.

In the following discussion, it will be assumed that the upstream unit which communicates over the wireless fronthaul link with the RU is a distributed unit. However, it will be appreciated that the RU BWP switching framework disclosed herein is broadly applicable to other types of upstream units. Regardless of how the baseband functionality is implemented upstream to the RU, the RU functions as a digital repeater to the downlink messages it receives from the upstream unit or node. The RU thus digitally repeats over the access link to the UE the downlink messages directed to the UE that the RU receives over the fronthaul link from the upstream unit. This repetition is deemed as a digital repetition in that the information content is repeated whereas the modulation, carrier frequency, and BWP may differ between the fronthaul and access links. Conversely, the repeater digitally repeats uplink messages it receives from a UE over the access link to the upstream unit. Just as in downlink digital repetition, the modulation, carrier frequency, and BWP may differ between the fronthaul and access links in uplink digital repetition.

Figure 1:
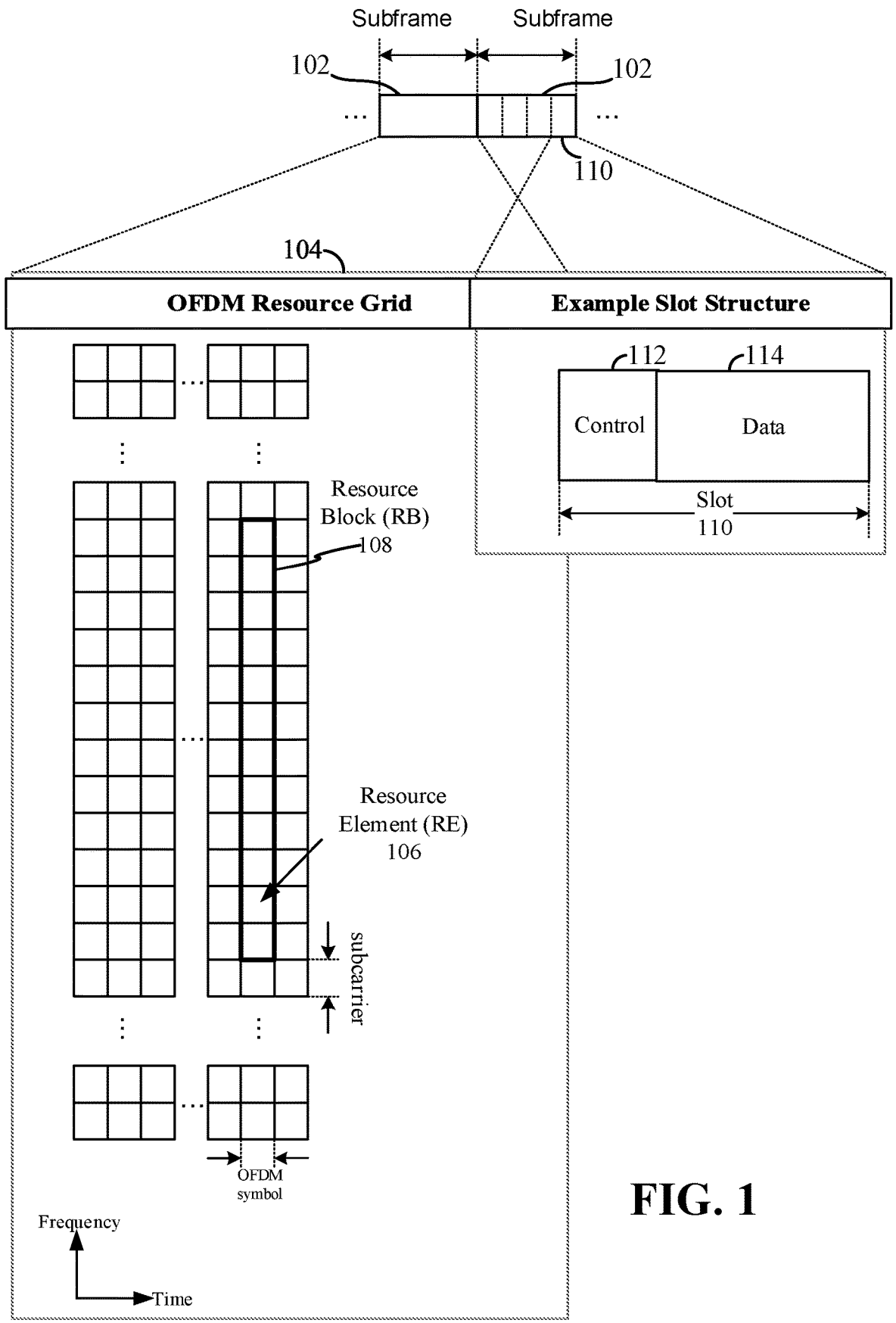
FIG. 1 illustrates some example orthogonal frequency-division multiplexing (OFDM) resources for a repeater in accordance with an aspect of the disclosure.

To better appreciate the BWP switch delay framework for a repeater, consider the following features of the orthogonal frequency-division multiplexing (OFDM) resources that are changed during a BWP switch. Various aspects of an OFDM waveform are schematically illustrated in FIG. 1. It should be understood by those of ordinary skill in the art that the various aspects of the present disclosure may be applied to a direct Fourier transform spread OFDM (DFT-s-OFDMA) waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame may refer to a duration of 10 ms for wireless transmissions, with each frame consisting of 10 subframes of 1 ms each. On a given carrier, there may be one set of frames in the uplink (UL), and another set of frames in the downlink (DL). An expanded view of a pair of exemplary DL subframes 102 is illustrated in FIG. 1, showing an OFDM resource grid 104. However, as those skilled in the art will readily appreciate, the PHY transmission structure for any particular application may vary from the example described here, depending on any number of factors. For resource grid 104, time is in the horizontal direction with units of OFDM symbols; and frequency is in the vertical direction with units of subcarriers or tones.

The resource grid 104 may be used to schematically represent time-frequency resources for a given antenna port. That is, in a multiple-input-multiple-output (MIMO) implementation with multiple antenna ports available, a corresponding multiple number of resource grids 104 may be available for communication. The resource grid 104 is divided into multiple resource elements (REs) 106. An RE, which is 1 subcarrier×1 symbol, is the smallest discrete part of the time-frequency grid, and contains a single complex value representing data from a physical channel or signal. Depending on the modulation and coding scheme utilized in a particular implementation, each RE 106 may represent one or more bits of information. In some examples, a block of REs 106 may be referred to as a physical resource block (PRB) or more simply a resource block (RB) 108, which contains any suitable number of consecutive subcarriers in the frequency domain. In one example, an RB 108 may include 12 subcarriers, a number independent of the numerology used, where numerology refers to the subcarrier spacing and cyclic prefix. In some examples, depending on the numerology, an RB 108 may include any suitable number of consecutive OFDM symbols in the time domain. Within the present disclosure, it is assumed that a single RB such as the RB 108 entirely corresponds to a single direction of communication (either receiving or transmitting for a given device). A set of contiguous RBs 108 such as shown for resource grid 104 form a bandwidth part (BWP).

A UE generally utilizes only a subset of the resource grid 104. An RB 108 may be the smallest unit of resources that can be allocated to a UE. Thus, the more RBs 108 scheduled for a UE, and the higher the modulation scheme chosen for the air interface, the higher the data rate for the UE. RB 108 is shown as occupying less than the entire bandwidth of each subframe 102, with some subcarriers illustrated above and below RB 108. In a given implementation, each subframe 102 may have a bandwidth corresponding to one or more RBs 108. Further, in this illustration, the RB 108 is shown as occupying less than the entire duration of the corresponding subframe 102, although this is merely one possible example.

Each subframe 102 (e.g., a 1 ms subframe) may consist of one or multiple adjacent slots. In the example shown in FIG. 1, one subframe 102 includes four slots 110, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 110 illustrates a control region 112 and a data region 114. In general, the control region 112 may carry control channels (e.g., a physical downlink control channel (PDCCH)), and the data region 114 may carry data channels (e.g., a physical downlink shared channel (PDSCH) or a physical uplink shared channel (PUSCH)). A slot may contain all DL, all UL, or at least one DL portion and at least one UL portion. The simple structure illustrated in FIG. 1 is merely exemplary in nature, and different slot structures may be utilized, and may include one or more of each of the control region(s) and data region(s).

Figure 2:
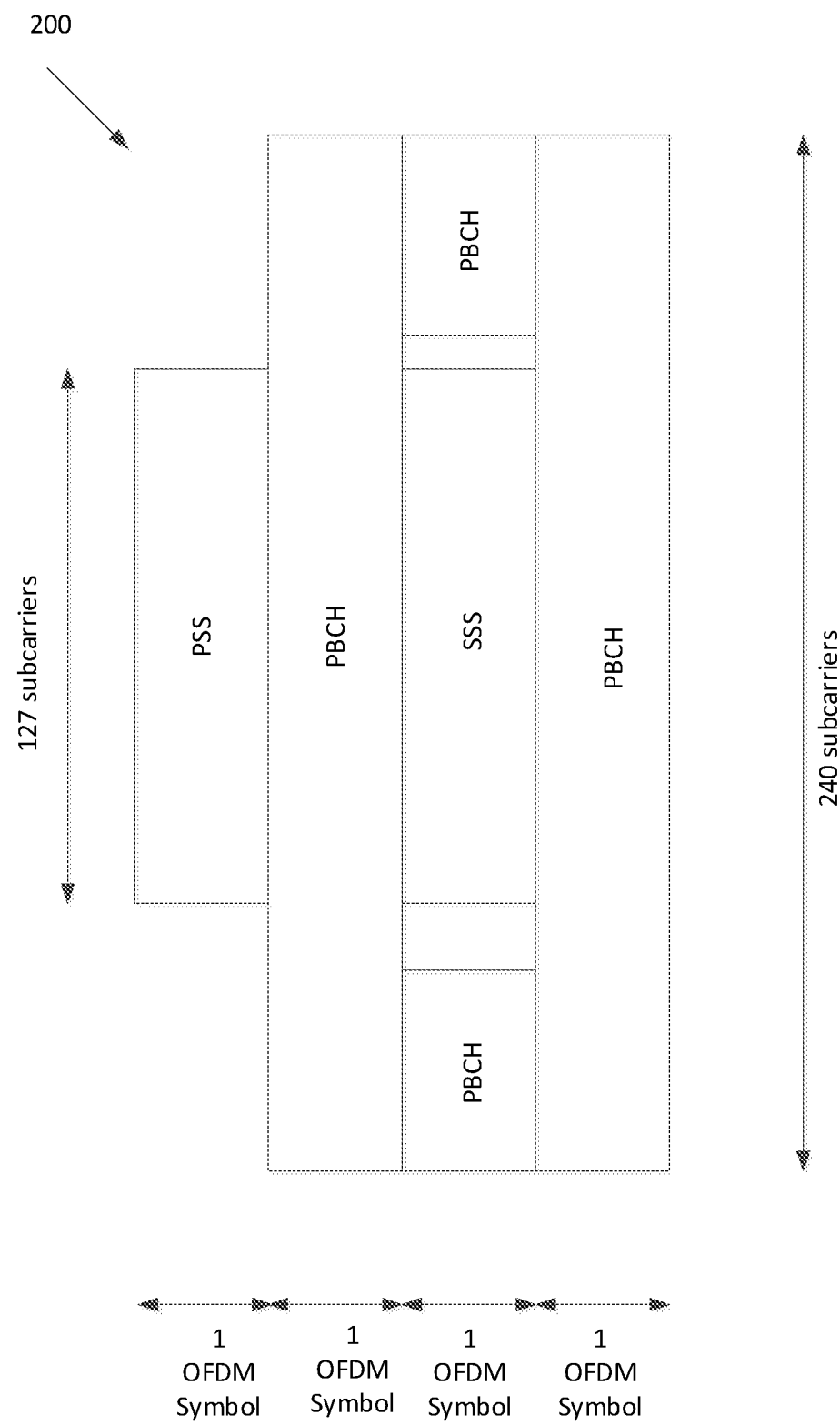
FIG. 2 illustrates an example synchronization signal block for a repeater in accordance with an aspect of the disclosure.

During an initial access to a cell, a UE performs a cell search by listening for synchronization signal blocks (SSBs). An example SSB 200 is shown in FIG. 2. SSB 200 extends over four OFDM symbols. The available bandwidth for SSB 200 is 240 subcarriers, which is 20 resource blocks. The first OFDM symbol may include a primary synchronization signal (PSS) that extends across 127 subcarriers within the center of the available bandwidth. A physical broadcast channel (PBCH) occupies all 240 subcarriers in the second OFDM symbol. A secondary synchronization signal (SSS) occupies the center 127 subcarriers within the third OFDM signal. If the 240-subcarrier bandwidth for SSB 200 is deemed to extend from a first resource block to a twentieth resource block, the PBCH occupies the first 4 resource blocks and the final four resource blocks in the third OFDM symbol. The PBCH also occupies all 240 subcarriers in the fourth OFDM symbol. The PBCH provides system information including a master information block (MIB). The MIB configures a zeroth control resource set (CORESET) that is a set of time and frequency resources within which a UE decodes candidate control channels. The UE may then acquire a first system information block (SIB1) to acquires its initial (default) UL and DL BWPs. These initial BWPs are denoted with an index zero. With the UE transitioning to a connected mode, the UE may then be configured through radio resource control (RRC) configuration to use a new UL BWP and/or a new DL BWP having a non-zero index.

Once a UE is in the connected mode, it may be configured though RRC with up to four DL BWPs although only one is active at any given time. These four DL BWPs are identified by corresponding indices of 1, 2, 3, and 4, respectively. Note that the zeroth BWPs are not considered to be RRC-configured BWP. Similar to the DL, a UE may also be configured through RRC with up to four UL BWPs although only one is active at any given time. The UL BWPs and the DL BWPs may be configured separately in a frequency-division-duplex network. However, in a time-division-duplex network, an UL BWP of a given index is not independent from a DL BWP having the same index as the DL BWPs and the UL BWPs in a time-division-duplex network will share a center frequency (but may have different bandwidths).

As noted earlier, a transition from one active BWP to another is denoted as BWP switching. A BWP switch for an RU or a UE may be controlled by RRC. Alternatively, a BWP switch for an RU or a UE may be responsive to a BWP indicator in a downlink control information (DCI) message. In addition, a BWP switch may be timer-based. The delay requirements for a UE to perform a BWP switch depends upon the UE capability, which is indicated by whether a UE is a type 1 or type 2 as defined, for example, in Release 15. A BWP switch may involve the same component carrier so that the associated BWP switching delay uses the same carrier scheduling. Alternatively, a BWP switch may also change the component carrier so that the associated BWP switching delay occurs with cross carrier scheduling. A BWP switching delay $T_{BWPswitchDelay}$ for a UE with same carrier scheduling is summarized in the following Table 1.

Table 1

TABLE 1

| SCS (KHz) | NR slot length (ms) | Type 1 BWP switch delay (slots) | Type 2 BWP Switch delay (slots) |
|---|---|---|---|
| 15 | 1 | 1 | 3 |
| 30 | 0.5 | 2 | 5 |
| 60 | 0.25 | 3 | 9 |
| 120 | 0.125 | 6 | 18 | where SCS is the subcarrier spacing.

The DCI-based BWP switching delay with cross carrier scheduling is defined with respect to a slot n in which the UE receives the BWP switching request in a serving cell. For a BWP switch, the UE is then required to be able to receive the physical downlink shared channel (PDSCH) (in the case of a DL BWP switch) or transmit the physical uplink shared channel (PUSCH) (in the case of an UL BWP switch) after a time duration of $T_{BWPswitchDelay}$+Y, which starts from the beginning of DL slot n, where $T_{BWPswitchDelay}$ is the BWP switch delay requirement from Table 1. The variable Y equals zero if the serving cell where the DCI for the BWP switch request was received is the same as the serving cell on which the BWP switch occurs. The variable Y equals one if the serving cells are different. Note that if Y equals one, the duration of $T_{BWPswitchDelay}$ may vary depending on the subcarrier spacing (SCS) in the serving cells such that the time duration $T_{BWPswitchDelay}$+Y depends upon the smallest SCS of either the serving cell in which the DCI was received or of the serving cell after the BWP switch.

A UE may simultaneously switch bandwidth parts on multiple component carriers such that UE is utilizing carrier aggregation. The maximum BWP switching delay for such a UE may be defined as a time duration $T_{MultipleBWPswitchDelay}$, where $T_{MultipleBWPswitchDelay}$ is defined as $T_{BWPswitchDelay}$+D*(N−1). Since there are multiple component carriers, $T_{MultipleBWPswitchDelay}$ is based upon the smallest subcarrier spacings for the various component carriers. D is an incremental delay for each additional component carrier in the simultaneous bandwidth part switching and depends upon the UE capability. N is the number of component carriers undergoing the simultaneous bandwidth part switching.

Figure 3:
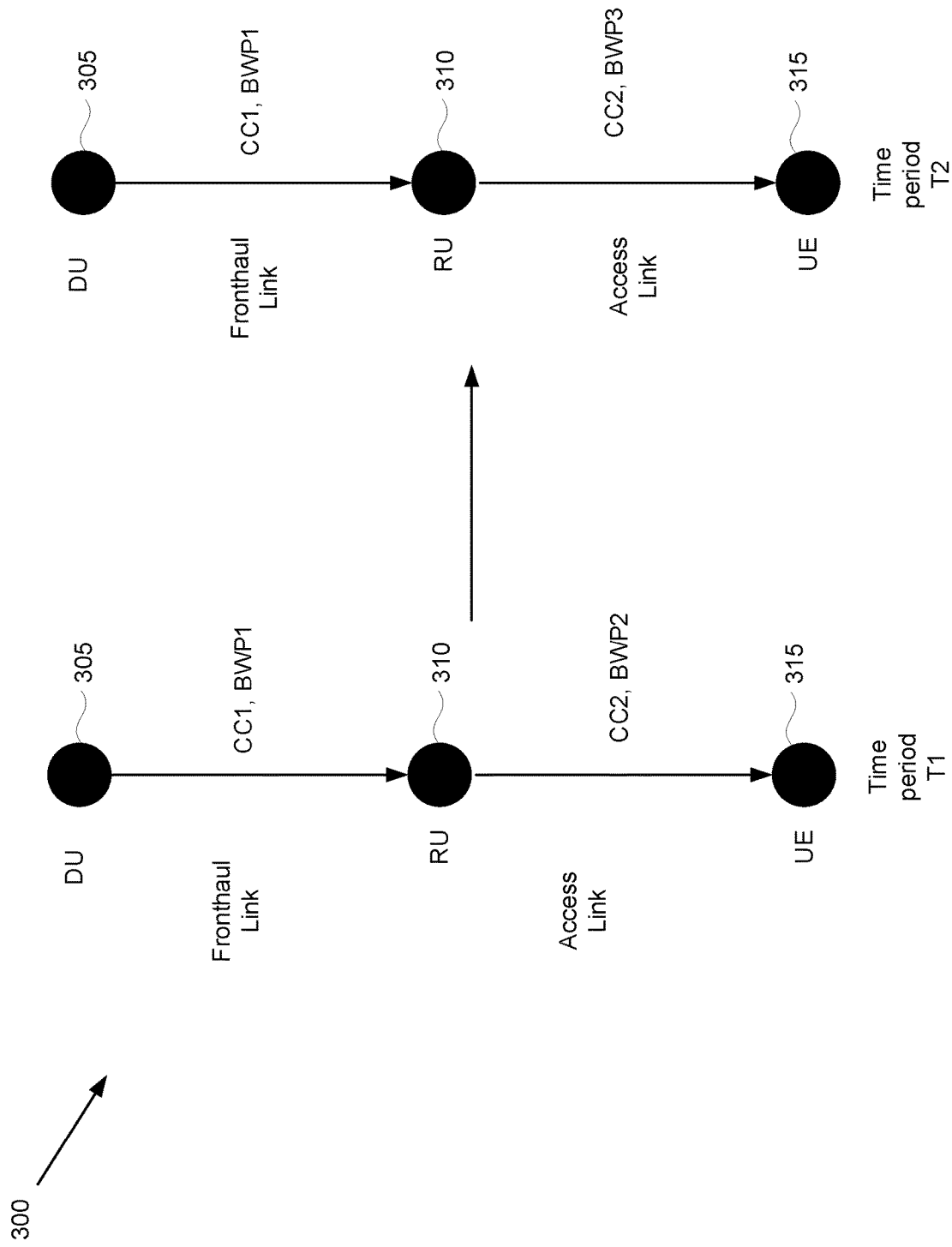
FIG. 3 illustrates a network in which a repeater performs a same carrier bandwidth part switch in the access link in accordance with an aspect of the disclosure.

Given these UE BWP switching delay requirements, an example RAN 300 with same carrier scheduling is shown in FIG. 3 that includes an upstream unit such as a distributed unit (DU) 305, an RU (or repeater) 310, and a UE 315. During a time period T1, DU 305 transmits to RU 310 over a fronthaul link using a first component carrier CC1 and a first bandwidth part BWP1. In turn, RU 310 transmits to UE 315 over an access link using a second component carrier CC2 and a second bandwidth part BWP2. Since the component carriers are different, RU 310 in RAN 300 is an out-of-band repeater. But it will be appreciated that the BWP switching concepts disclosed herein are also applicable to an in-band repeater. At an end of time period T1, the second bandwidth part BWP2 is switched to a third bandwidth part BWP3 to begin operation in a time period T2.

Although the BWP is switched for the access link, DU 305 has not performed a BWP switch from period T1 to period T2 so it continues to transmit over the first bandwidth part BWP1 using the first component carrier CC1. But RU 310 and UE 315 have both performed a BWP switch to the third bandwidth part BWP3 on the second component carrier CC2. Regardless of whether this BWP switch is responsive to a timer or a network command such as received through a downlink control information (DCI) message, the BWP switch delay for UE 315 is well understood as specified in Table 1. But the BWP switch delay for RU 310 was undefined. A solution to this BWP switch delay dilemma will be provided herein. As discussed previously, it was conventional for a UE to support at least four different BWPs. To allow bandwidth part switching, RU 310 needs to support more than one BWP.

Figure 4:
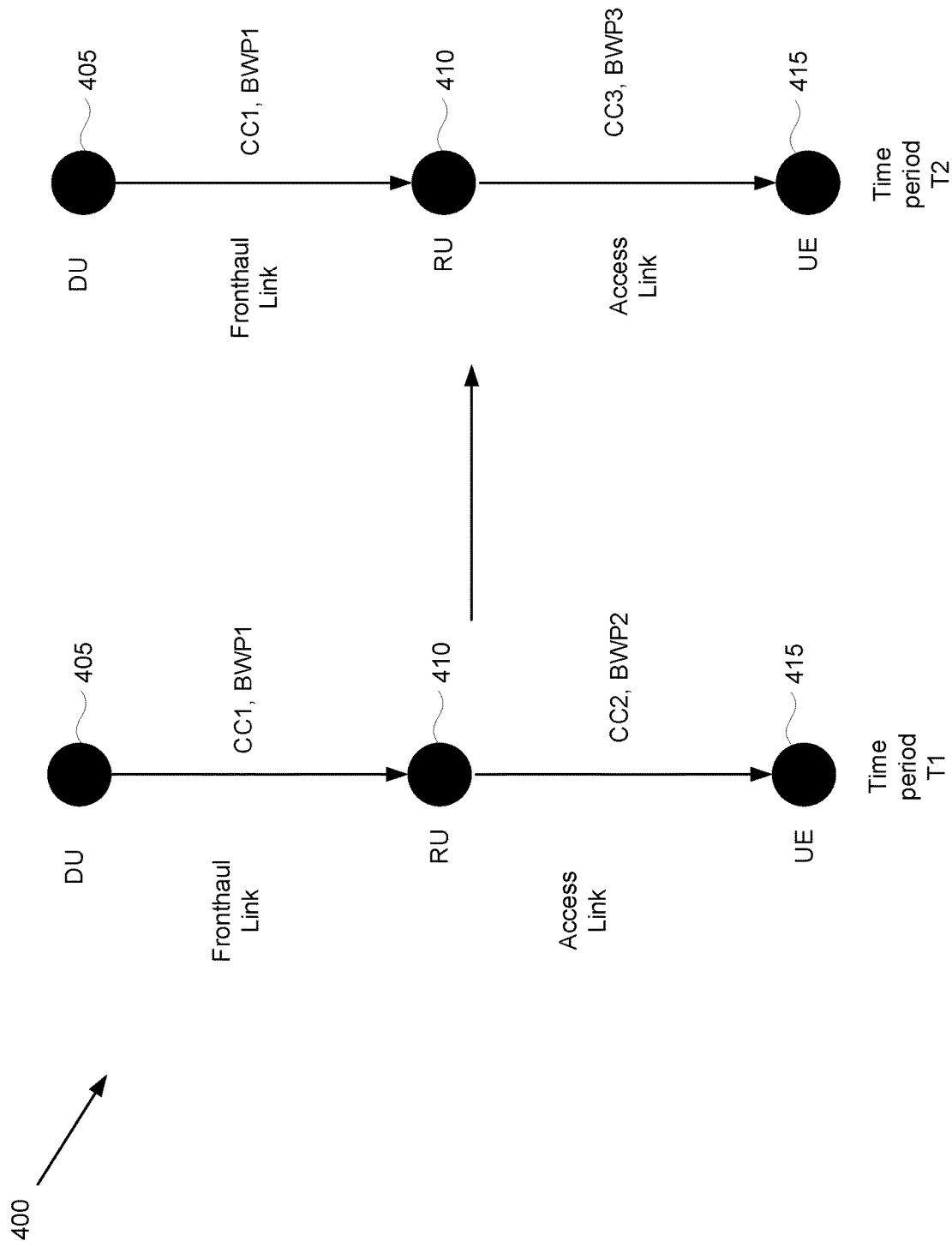
FIG. 4 illustrates a network in which a repeater performs a cross carrier bandwidth part switch in the access link in accordance with an aspect of the disclosure.

An example RAN 400 with cross carrier BWP switching is shown in FIG. 4. An upstream unit such as a DU 405, an RU 410, and a UE 415 are arranged analogously as discussed for RAN 300. In a time period T1, RU 410 receives its downlink from DU 405 over the first bandwidth part BWP1 using the first component carrier CC1. At the same time, UE 415 receives its downlink from RU 410 over the second bandwidth part BWP2 using the second component carrier CC2. In time period T2, UE 415 now receives its downlink from RU 410 over the third bandwidth part BWP3 using a third component carrier CC3. DU 405 in RAN 400 does not perform a bandwidth part switch from period T1 to period T2. Due to the cross-carrier BWP switching, the BWP switch delay for UE 415 is defined by $T_{BWPswitchDelay}+Y$ as discussed earlier. But the BWP switch delay for UE 415 is undefined. A solution to this BWP switch delay dilemma will be provided herein.

Figure 5:
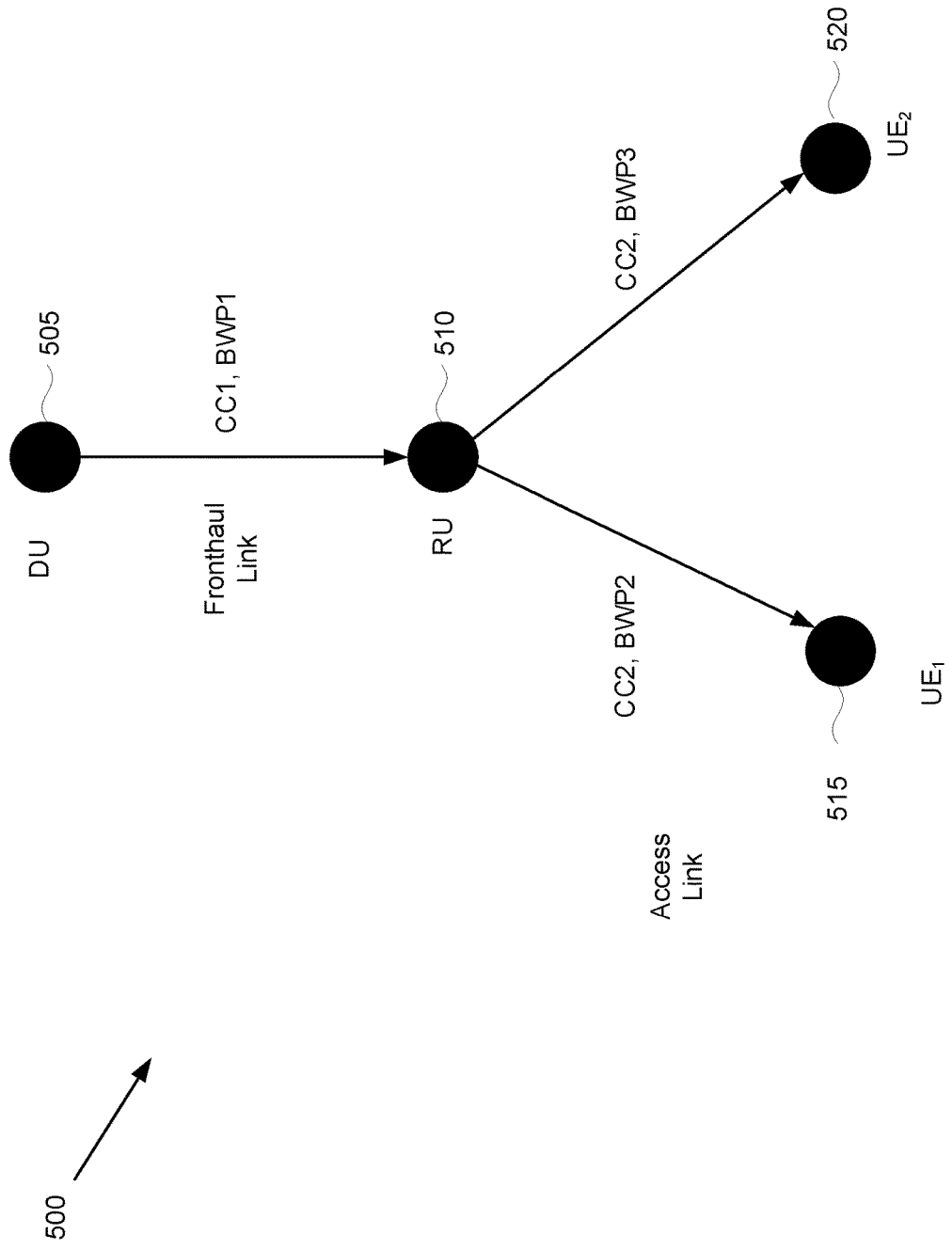
FIG. 5 illustrates a network in which a repeater supports a plurality of active user equipments in accordance with an aspect of the disclosure.

As shown for a network 500 with same carrier scheduling in FIG. 5, an RU 510 may be repeating the downlink for a plurality of UEs. For illustration clarity, just a first UE 515 and a second UE 520 are shown in network 500. An upstream unit such as a DU 505 transmits to the RU 510 over the fronthaul link as discussed with regard to network 300. DU 505 thus transmits to RU 510 over the first bandwidth part BWP1 using the first component carrier CC1. RU 510 transmits to UE 515 over the second bandwidth part BWP2 using the second component carrier CC2. Similarly, RU 510 transmits to UE 520 over the third bandwidth part BWP2 using the second component carrier CC2. The BWP for the downlink from RU 510 encompasses both the second bandwidth part BWP2 and the third bandwidth part BWP3. The bandwidth part for RU 510 in the access link is thus a superset or addition of the second bandwidth part BWP2 and the third bandwidth part BWP3. The BWP switching delay for UEs 515 and 520 is as discussed for Table 1.

Figure 6:
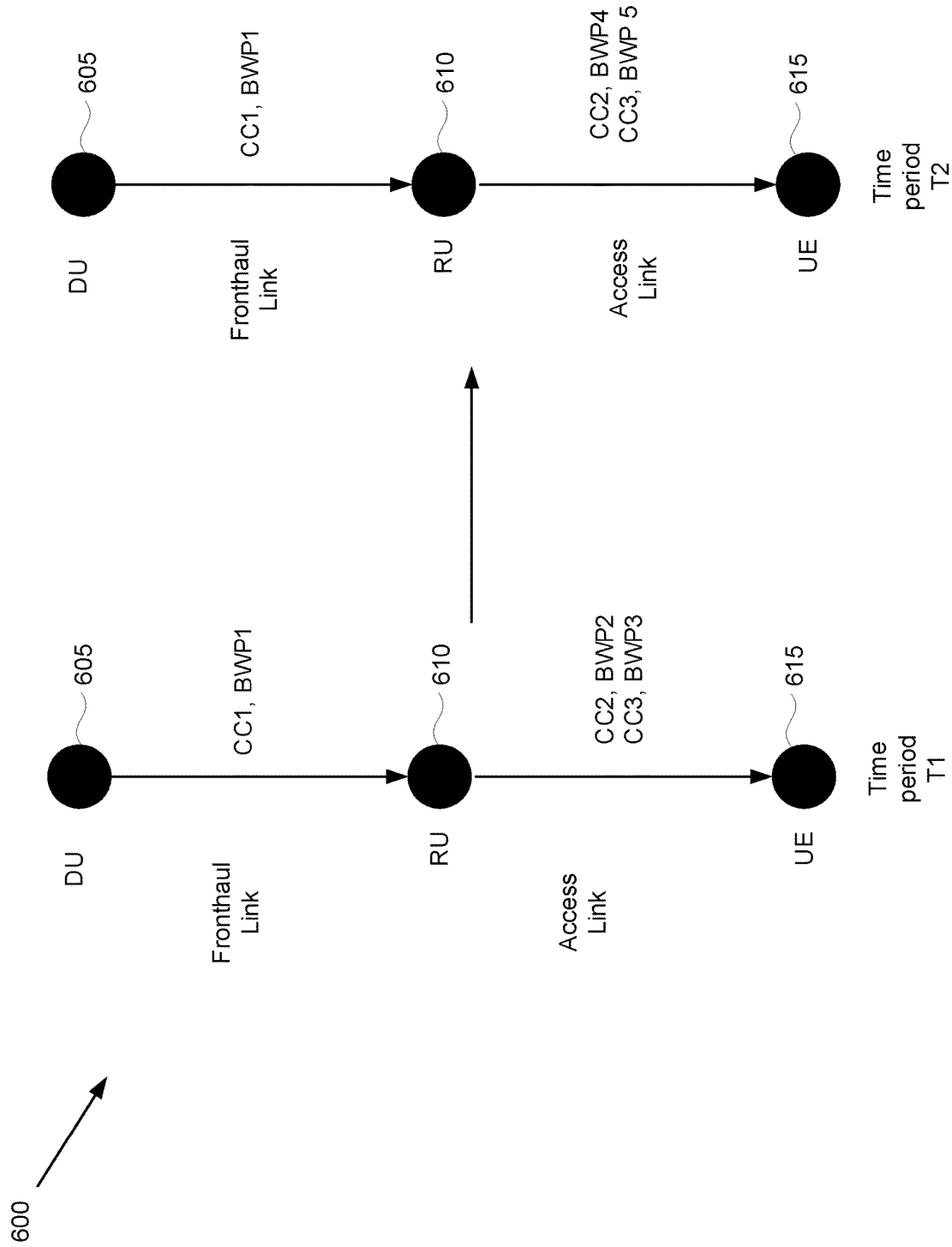
FIG. 6 illustrates a network in which a repeater performs a simultaneous bandwidth part switch over a plurality of component carriers in the access link in accordance with an aspect of the disclosure.

A network 600 in which an RU 610 performs simultaneous access link BWP switching on multiple component carriers is shown in FIG. 6. An upstream unit such as a DU 605, RU 610, and a UE 615 are arranged analogously as discussed for RAN 400. In a time period T1, RU 610 receives its downlink from DU 605 over a first bandwidth part BWP1 using a first component carrier CC1. At the same time, UE 615 receives its downlink from RU 610 over a second bandwidth part BWP2 using a second component carrier CC2 and over a third bandwidth part BWP3 using a third component carrier CC3. RU 610 switches its access link bandwidth parts between time period T1 and a time period T2. In time period T2, UE 615 now receives its downlink from RU 610 over a fourth bandwidth part BWP4 using the second component carrier CC2 and over a fifth bandwidth part BWP5 using the third component carrier CC3. DU 605 in RAN 600 does not perform a bandwidth part switch from period T1 to period T2. Due to the simultaneous BWP switching across multiple component carriers, the BWP switch delay for UE 615 is defined by $T_{MultipleBWPswitchDelay}$ as discussed earlier. But the BWP switch delay for UE 615 is undefined. A solution to this BWP switch delay dilemma will be provided herein.

In the following discussion, the term "BWP" with reference to the RU in either the fronthaul link or the access link without further clarification will be understood to refer to the downlink BWP but the same concepts apply to its UL BWP. In general, the network commands the RU to perform a BWP switch from one active BWP to another. This active BWP being switched may be in the fronthaul link, in the access link, or in both of these links. To provide a framework for RU BWP switching, the granularity (frequency) of the RU BWP switching schedule will first be discussed followed by a discussion of the RU BWP switching timeline.

RU BWP Switching Granularity

An RU BWP switching framework including setting the granularity or frequency of the RU BWP switching. The BWP switching for an RU is determined by the network such as through messaging from the DU. The resulting bandwidth part switching for the RU may be semi-static/periodic or dynamic manner depending upon whether the corresponding UE(s) have their BWP switching schedule configured to be semi-static/periodic or dynamic. For example, the network may schedule the UE(s) to perform a bandwidth part switching in a semi-static manner. The RU may then be scheduled in a corresponding semi-static pattern. More generally, the UEs are scheduled to switch their BWP(s) according a UE BWP switching schedule. The RU will then switch its BWP(s) according to an RU BWP switching schedule that is responsive to the UE BWP switching schedule. For example, if the UE BWP switching schedule is dynamic, then the RU BWP switching schedule is dynamic. Conversely, if the UE BWP switching schedule is semi-static or periodic, then the RE BWP switching schedule is semi-static or periodic. Referring again to network 500, note that the BWP switching for RU 510 may be more granular than the BWP switching at UEs 515 and 520 since the BWP for RU 510 in the access link is the superset of the bandwidth parts for UEs 515 and 520. RU 510 thus need not switch its access link BWP each time one of its UEs needs to change. The RU BWP thus may remain static if the superset of the UE bandwidth parts is unchanged despite a UE BWP switch for one of the UEs within the superset. Instead, the RU BWP may change only when a change has occurred to the superset of the UE bandwidth parts. The network may then schedule the BWP switching for RU 510 at this more granular rate.

RU BWP Switching Timeline

With respect to a timeline for the RU BWP switching in the access link, the BWP switching delay requirement for an RU is relaxed (a larger BWP switching delay) as compared to the BWP switching delay requirement for a UE. This relaxation in the BWP switching delay for an RU occurs because the network will typically inform the RU of a BWP switch prior to the network informing the UE of a BWP switch. For example, suppose that an RU transmits in an nth slot a UE DCI message in the access link that commands a UE to perform a BWP switch by an (n+m)th slot (n and m being positive integers). In that case, the RU may have received a RU DCI message over the fronthaul link in an (n−L)th slot that commands the RU to be prepared to transmit the UE DCI message in the nth slot, where L is a positive integer. Should the individual UE BWP switch affect the superset of UE BWPs such that the RU must also switch its BWP part by the (n+M)th slot, the RU has L slots greater in time to switch is BWP as compared to the UE. Note that this parameter L may be a repeater capability that the RU signals to the network.

Given these general concepts for the granularity of the RU BWP switching schedule and the RU BWP switching timeline, a same carrier RU BWP access link switching delay as discussed with regard to network 300 will be addressed. The UE BWP switching delay for network 300 is $T_{BWPswitchDelay}$ as defined in Table 1 above. The RU BWP access link switching delay using the same carrier is thus $T_{BWPswitchDelay}$ plus L slots. Similarly, a cross carrier RU BWP access link switching delay such as for RU 410 in network 400 is also $T_{BWPswitchDelay}$ plus L slots. But note that for cross carrier BWP switching as discussed for network 400, the delay $T_{BWPswitchDelay}$ depends upon the smallest subcarrier spacing for the corresponding bandwidth parts BWP2 and BWP3. But additional BWP switching delay may be required to do BWP switching for out-of-band repeaters (the component carriers being different in the wireless fronthaul and access links) such as shown for network 400. The delay $T_{BWPswitchDelay}$ delay for an RU 410 may thus depend upon the smallest subcarrier spacing for the bandwidth parts BWP1, BWP2, and BWP3. Finally, the BWP switch delay for RU 610 in network 600 in which a simultaneous BWP switch occurs over multiple component carriers is $T_{MultipleBWPswitchDelay}$ plus L slots. But note that the variable D for the RU BWP switch delay in this case may be the minimum value of the D for the active UEs served by RU 610. Alternatively, RU 610 may be mandated to use the smallest value of D that is allowed for UEs in network 600 so that RU 610 may efficiently accommodate the BWP switching for these UEs. The setting of the RU BWP switch delay may be a dynamic process in some embodiments.

Figure 7:
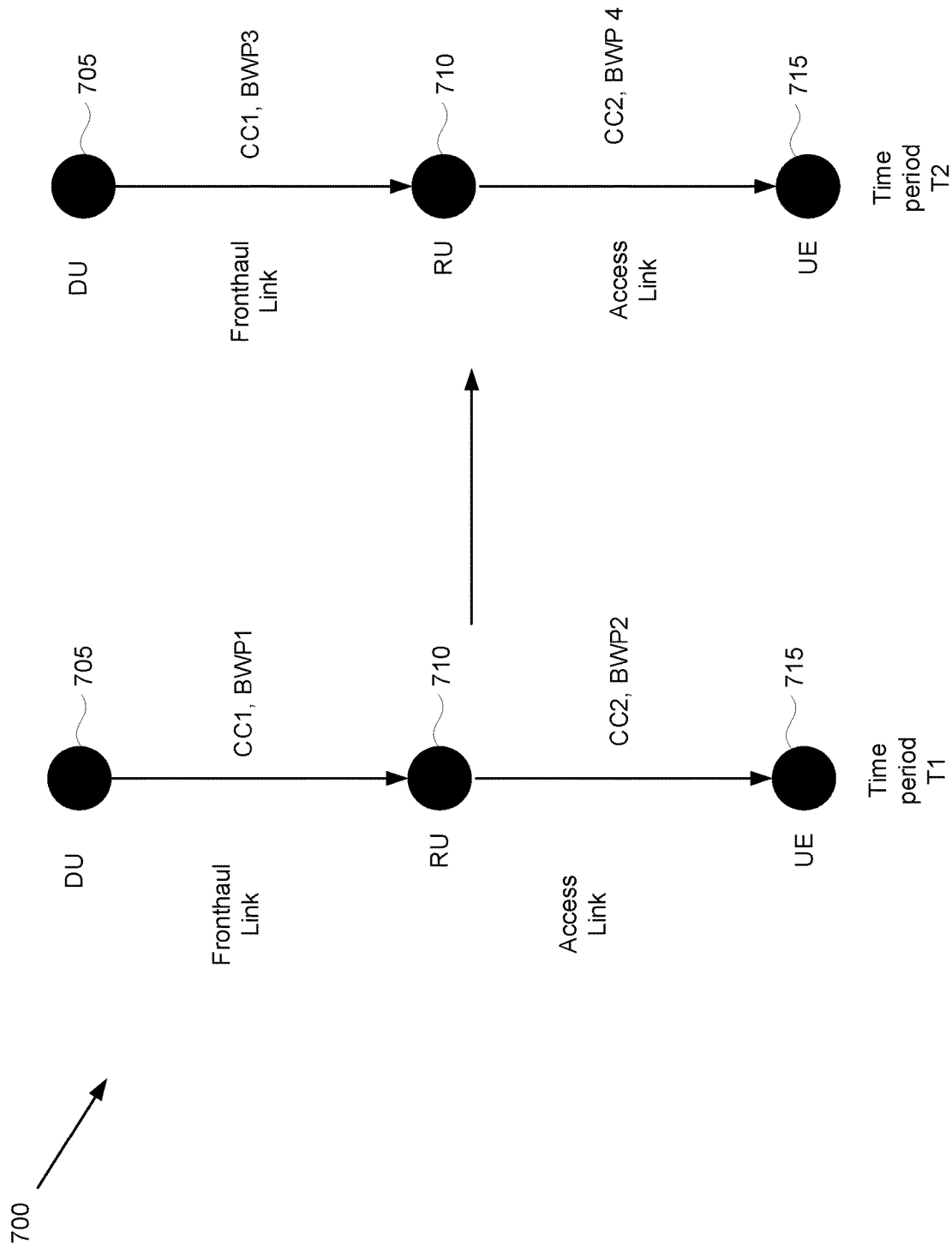
FIG. 7 illustrates a network in which a repeater performs a same carrier bandwidth part switching in the both the fronthaul link and the access link in accordance with an aspect of the disclosure.

Although the previous discussion was focused on the RU BWP switching in the access link, note that there may be benefits (e.g., power savings) to perform BWP switching for the RU in the fronthaul link as well. For example, a network 700 in which an RU 710 performs BWP switching in both the fronthaul link and in the access link is shown in FIG. 7. An upstream unit such as a DU 705, RU 710, and a UE 715 are arranged analogously as discussed for RAN 600. In a time period T1, RU 710 receives its downlink from DU 705 over the first bandwidth part BWP1 using the first component carrier CC1. At the same time, UE 715 receives its downlink from RU 710 over the second bandwidth part BWP2 using the second component carrier CC2. RU 610 switches both its fronthaul link and access link bandwidth parts between time period T1 and a time period T2. In time period T2, RU 710 now receives its downlink from DU 705 over a third bandwidth part BWP using the first component carrier CC1. Similarly, UE 715 receives its downlink from RU 710 over a fourth bandwidth part BWP4 using a third component carrier CC3. The RU BWP switching delay for such a same carrier fronthaul link BWP switch and a cross carrier access link BWP switch may then be defined as $T_{BWPswitchDelay}$ plus L slots, where $T_{BWPswitchDelay}$ is dependent upon the smallest subcarrier spacings for BWP1, BWP2, BWP3, and BWP4. An example repeater architecture will now be discussed.

Example Repeater Architecture

Figure 8:
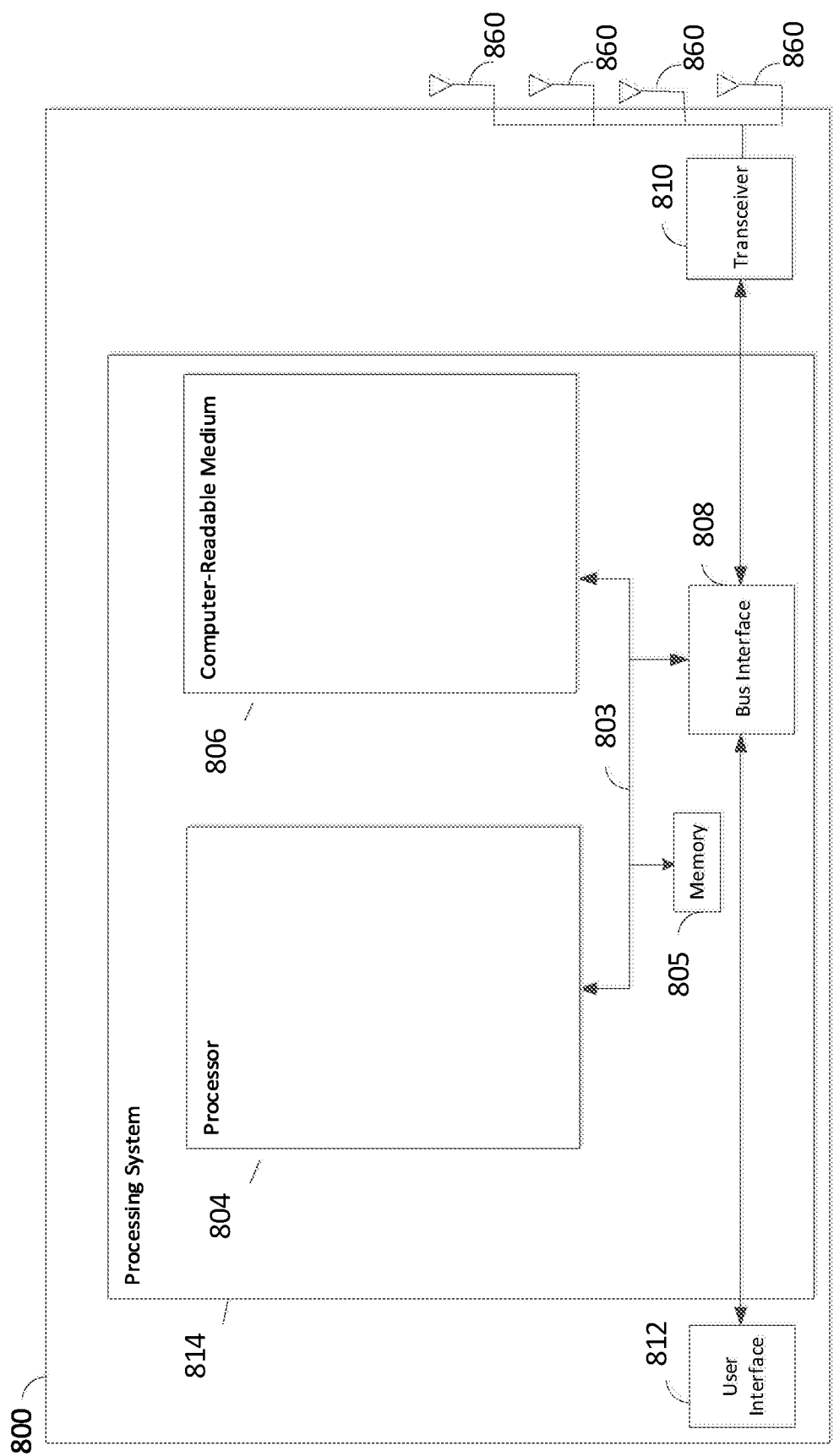
FIG. 8 illustrates an example repeater in accordance with an aspect of the disclosure.

A repeater 800 is shown in FIG. 8 that is generic to the RU BWP switching framework disclosed herein. Repeater 800 includes a processing system 814 having a bus interface 808, a bus 802, memory 805, a processor 804, and a computer-readable medium 806. Furthermore, repeater 800 may include a user interface 812 and a transceiver 810. Transceiver 810 transmits and receives through an array of antennas 860.

Processor 804 is also responsible for managing the bus 802 and general processing, including the execution of software stored on the computer-readable medium 806. The software, when executed by the processor 804, causes the processing system 814 to RU BWP switching discussed with regard to networks 300, 400, 500, 600, and 700. The computer-readable medium 806 and the memory 805 may also be used for storing data that is manipulated by the processor 804 when executing software.

The bus 802 may include any number of interconnecting buses and bridges depending on the specific application of the processing system 814 and the overall design constraints. The bus 802 communicatively couples together various circuits including one or more processors (represented generally by the processor 804), the memory 805, and computer-readable media (represented generally by the computer-readable medium 806). The bus 802 may also link various other circuits such as timing sources, peripherals, voltage regulators, and power management circuits, which are well known in the art, and therefore, will not be described any further. The bus interface 808 provides an interface between the bus 802 and the transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided.

Some aspects of the preceding discussion will now be summarized in the following clauses.

Clause 1. A method of wireless communication for a repeater equipment, comprising: receiving at a repeater over a wireless fronthaul link a first command from an upstream unit;
 at the repeater, repeating the first command over a wireless access link to at least one user equipment, the first command being a command to switch at least one user equipment bandwidth part in the wireless access link according to a user equipment bandwidth part switching schedule; and switching a repeater bandwidth part for the repeater in the wireless access link according a repeater bandwidth part switching schedule that is responsive to the user equipment bandwidth part switching schedule.

Clause 2. The method of clause 1, wherein the user equipment bandwidth part switching schedule is semi-static, and wherein the repeater bandwidth part switching schedule is semi-static.

Clause 3. The method of clause 1, wherein the user equipment bandwidth part switching schedule is dynamic, and wherein the repeater bandwidth part switching schedule is dynamic.

Clause 4. The method of clause 1, wherein the user equipment bandwidth part switching schedule is periodic, and wherein the repeater bandwidth part switching schedule is periodic.

Clause 5. The method of any of clauses 1-4, wherein repeating the first command over the wireless access link to the at least one user equipment comprises repeating the first command over the wireless access link to a plurality of user equipments to switch a plurality of user equipment bandwidth parts, and wherein the repeater bandwidth part is a superset of the user equipment bandwidth parts.

Clause 6. The method of clause 5, wherein a granularity of the repeater bandwidth part switching schedule is coarser than a granularity of the user equipment switching schedule.

Clause 7. The method of any of clauses 1-6, wherein the first command comprises a downlink control information command.

Clause 8. The method of any of clauses 1-7, wherein receiving the first command at the repeater comprises receiving the first command in a first slot.

Clause 9. The method of clause 8, wherein repeating the first command over the access link to the least one user equipment comprises repeating the first command in a second slot that is subsequent to the first slot.

Clause 10. The method of clause 9, further comprising:
transmitting from the repeater over the wireless fronthaul link to the upstream unit an identification of a delay in slots between the first slot and the second slot.

Clause 11. A method of bandwidth part switching for a repeater, comprising:
in a first slot, receiving at the repeater a bandwidth part switching command for switching from a first bandwidth part to a second bandwidth part;
determining a bandwidth part switching delay as a function of a subcarrier spacing for the first bandwidth part and a subcarrier spacing for the second bandwidth part; and
in a second slot separated from the first slot by the bandwidth part switching delay, switching the repeater from the first bandwidth part to the second bandwidth part over a first component carrier for a wireless access link between the repeater and at least one user equipment.

Clause 12. The method of clause 11, wherein determining the bandwidth part switching delay is also a function of a third bandwidth part for the repeater in a wireless fronthaul link between the repeater and an upstream unit.

Clause 13. The method of claim 11, wherein the bandwidth part switching command is a command to bandwidth part switch over the first component carrier and over a second component carrier for the wireless access link, the method further comprising:
switching the repeater from a third bandwidth part to a fourth bandwidth part over the second component carrier.

Clause 14. The method of clause 13, wherein determining the bandwidth part switching delay is also a function of a subcarrier spacing for the third bandwidth part and a subcarrier spacing for the fourth bandwidth part.

Clause 15. The method of clause 14, wherein determining the bandwidth part switching delay is based upon a maximum of the subcarrier spacing for the first bandwidth part, the subcarrier spacing for the second bandwidth part, the subcarrier spacing for the third bandwidth part, and the subcarrier spacing for the fourth bandwidth part.

Clause 16. A repeater comprising:
a transceiver; and
a processor configured to:
process a first command received at the transceiver from an upstream unit over a wireless fronthaul link;
control the transceiver to repeat the first command over a wireless access link to at least one user equipment, the first command being a command to switch at least one user equipment bandwidth part in the wireless access link according to a user equipment bandwidth part switching schedule; and
control the transceiver to switch a repeater bandwidth part in the wireless access link according a repeater bandwidth part switching schedule that is responsive to the user equipment bandwidth part switching schedule.

Clause 17. The repeater of clause 16, wherein the processor is further configured to control the transceiver to repeat the command first over the wireless access link to a plurality of user equipments to switch a plurality of user equipment bandwidth parts, and wherein the repeater bandwidth part is a superset of the user equipment bandwidth parts.

Clause 18. The repeater of clause 17, wherein the processor is further configured to control the transceiver so that a granularity of the repeater bandwidth part switching schedule is coarser than a granularity of the user equipment switching schedule.

Clause 19. The repeater of any of clauses 16-18, wherein the first command comprises a downlink control information command.

Clause 20. The repeater of clause 16, wherein the processor is further configured to control the transceiver to repeat the first command in a slot that is subsequent to a slot in which the transceiver received the first command.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims.

What is claimed is:

1. A method of wireless communication for a repeater, comprising:
receiving at the repeater over a wireless fronthaul link a first command from an upstream unit;
repeating, at the repeater, the first command over a wireless access link to an at least one user equipment, the first command being a command to switch an at least one user equipment bandwidth part in the wireless access link according to a user equipment bandwidth part switching schedule; and
switching a repeater bandwidth part for the repeater in the wireless access link according to a repeater bandwidth part switching schedule that schedules the repeater to switch the repeater bandwidth part according to a function of the user equipment bandwidth part switching schedule.

2. The method of claim 1, wherein the user equipment bandwidth part switching schedule is semi-static, and wherein the repeater bandwidth part switching schedule is semi-static.

3. The method of claim 1, wherein the user equipment bandwidth part switching schedule is dynamic, and wherein the repeater bandwidth part switching schedule is dynamic.

4. The method of claim 1, wherein the user equipment bandwidth part switching schedule is periodic, and wherein the repeater bandwidth part switching schedule is periodic.

5. The method of claim 1, wherein repeating the first command over the wireless access link to the at least one user equipment comprises repeating the first command over the wireless access link to a plurality of user equipments to switch a plurality of user equipment bandwidth parts, and wherein the repeater bandwidth part is a superset of the plurality of user equipment bandwidth parts.

6. The method of claim 5, wherein a granularity of the repeater bandwidth part switching schedule is coarser than a granularity of the user equipment switching schedule.

7. The method of claim 1, wherein the first command comprises a downlink control information command.

8. The method of claim 1, wherein receiving the first command at the repeater comprises receiving the first command in a first slot.

9. The method of claim 8, wherein repeating the first command over the access link to the least one user equipment comprises repeating the first command in a second slot that is subsequent to the first slot.

10. The method of claim 9, further comprising:
transmitting from the repeater over the wireless fronthaul link to the upstream unit an identification of a delay in slots between the first slot and the second slot.

11. A repeater comprising:
a transceiver; and
at least one processor configured to:
process a first command received at the transceiver from an upstream unit over a wireless fronthaul link;
control the transceiver to repeat the first command over a wireless access link to at least one user equipment, the first command being a command to switch at least one user equipment bandwidth part in the wireless access link according to a user equipment bandwidth part switching schedule; and
control the transceiver to switch a repeater bandwidth part in the wireless access link according to a repeater bandwidth part switching schedule that is a function of the user equipment bandwidth part switching schedule.

12. The repeater of claim 11, wherein the at least one processor is further configured to control the transceiver to repeat the command first over the wireless access link to a plurality of user equipments to switch a plurality of user equipment bandwidth parts, and wherein the repeater bandwidth part is a superset of the plurality of user equipment bandwidth parts.

13. The repeater of claim 12, wherein the at least one processor is further configured to control the transceiver so that a granularity of the repeater bandwidth part switching schedule is coarser than a granularity of the user equipment switching schedule.

14. The repeater of claim 11, wherein the first command comprises a downlink control information command.

15. The repeater of claim 11, wherein the at least one processor is further configured to control the transceiver to repeat the first command in a slot that is subsequent to a slot in which the transceiver received the first command.

16. The repeater of claim 11, wherein the user equipment bandwidth part switching schedule is semi-static, and wherein the repeater bandwidth part switching schedule is semi-static.

17. The repeater of claim 11, wherein the user equipment bandwidth part switching schedule is dynamic, and wherein the repeater bandwidth part switching schedule is dynamic.

18. The repeater of claim 11, wherein the user equipment bandwidth part switching schedule is periodic, and wherein the repeater bandwidth part switching schedule is periodic.

19. The repeater of claim 11, wherein a granularity of the repeater bandwidth part switching schedule is coarser than a granularity of the user equipment switching schedule.

* * * * *